Oct. 13, 1953

C. L. EKSERGIAN 2,655,227

DISK BRAKE

Filed July 29, 1950

INVENTOR.
Carolus L. Eksergian
BY
*Maurice A. Crewe*
ATTORNEY

Patented Oct. 13, 1953

2,655,227

UNITED STATES PATENT OFFICE 2,655,227

DISK BRAKE

Carolus L. Eksergian, Media, Pa., assignor to The Budd Company, Philadelphia, Pa., a corporation of Pennsylvania Application July 29, 1950, Serial No. 176,695

5 Claims. (Cl. 188—72)

1

The invention relates to a brake mechanism and, more particularly, to a disc brake mechanism adapted for application to automotive vehicles, such as passenger carrying motor cars.

It is an object of the invention to provide a simplified form of such brake mechanism, which can be produced at low cost and which provides an efficient brake capable of being readily serviced, and one which has long life.

Other and further objects and advantages and the manner in which they are attained will become evident from the following detailed description when read in connection with the accompanying drawings forming a part of the specification.

In the drawings:

Fig. 3 is a similar sectional view taken substantially along the line 3—3 of Fig. 1; and Fig. 4 is a detail sectional view taken substantially along the line 4—4 of Fig. 1.

Figure 1:
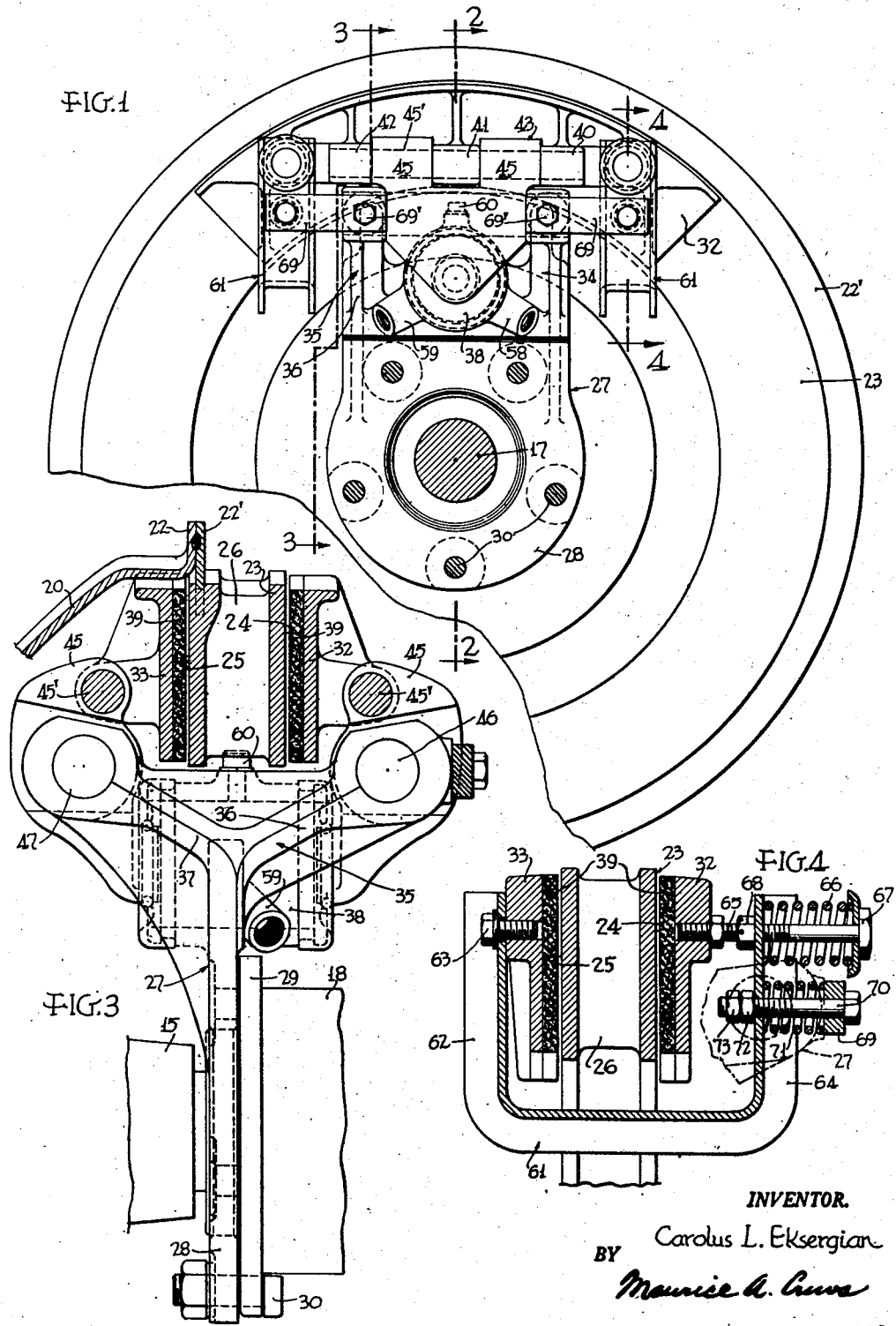
Fig. 1 is an elevational view of the novel brake mechanism, looking at the inboard side of a wheel with which it is shown associated, parts being broken away and parts shown in section, the view being taken substantially along the line 1—1 of Fig. 2, looking in the direction of the arrows at the ends of the line.

In the drawings, the brake mechanism embodying the invention has been shown associated with the rear wheel of an automobile, but it will be understood that it is equally applicable to a front wheel or in other relations, if desired.

The wheel designated by numeral 10 is a usual form of disc wheel having a drop center rim 11 seated on and secured in a usual manner to the peripheral flange 12 of the wheel. The wheel is removably mounted on the hub flange 13 by an annular series of bolts, as 14. The hub barrel 15 is non-rotatably secured in usual manner upon the tapered end 16 of the axle 17, and the latter is rotatably mounted in the axle housing 18 through the roller bearings as 19.

The rotating element of the improved brake comprises a dished supporting plate 20 seated, in this embodiment, against the outer face of the hub flange 13 and held in place by screws, as 21, and the wheel securing bolts, as 14. The outer periphery of this supporting plate is flanged radially outwardly at 22 and to this flange is secured, as by welding, the annulus 22' which carries the brake ring 23 having opposed radially extending braking faces 24 and 25 and the radial cooling passages 26 therebetween. The deep dish

2 of the supporting plate and the location of the brake ring 23 adjacent the rim leaves ample space radially inwardly between the brake ring and the axle housing for the disposition of the stationary brake mechanism associated with the rotating element.

Figure 2:
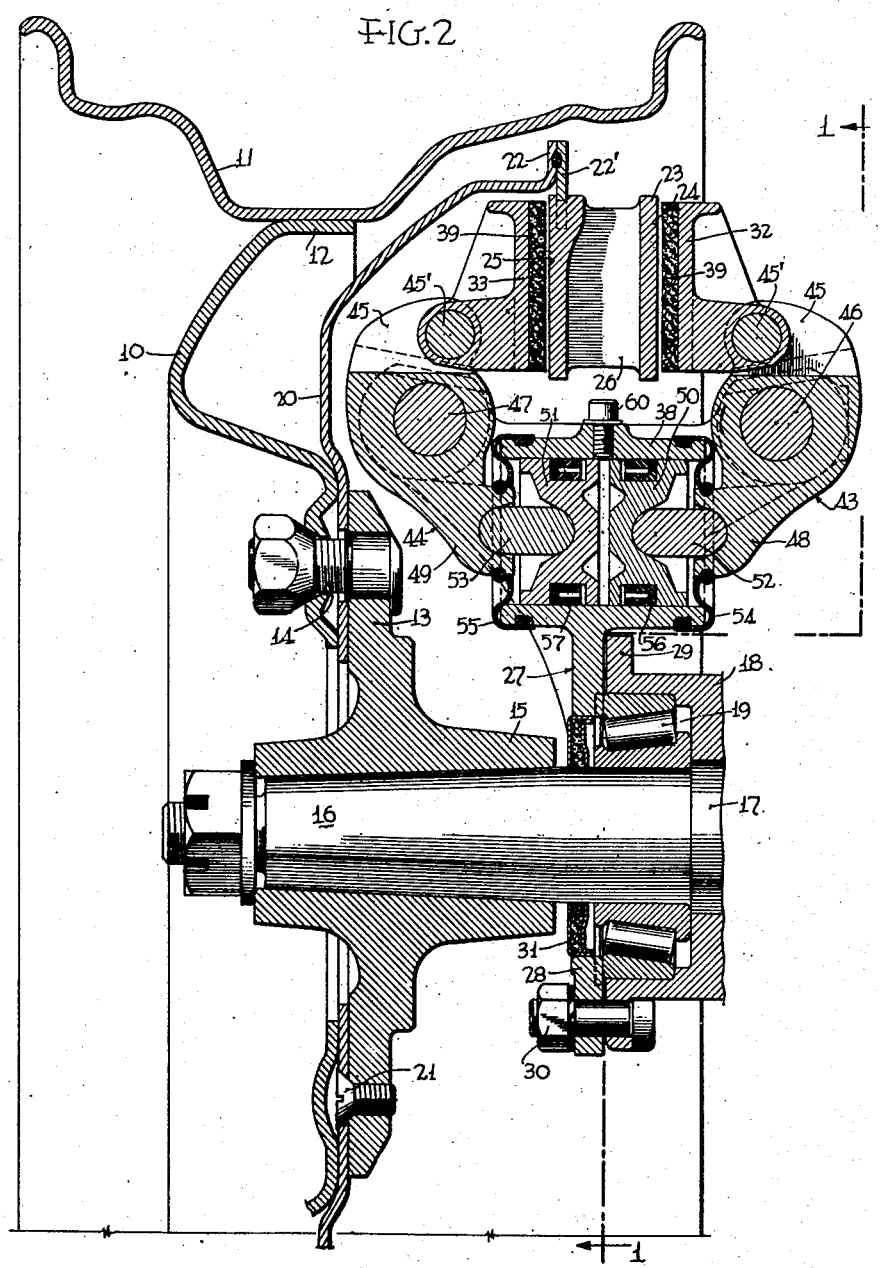
Fig. 2 is an enlarged detail sectional view taken substantially along the line 2—2 of Fig. 1.

This mechanism comprises a radially disposed spider 27 having a flat annular radially inner bolting-on portion 28, through which it is rigidly secured to the flanged end 29 of the axle housing by a series of bolts 30. The inner periphery of the annular portion 28 may, as shown in Fig. 2, overlap the outer race of the bearing 19 to hold the bearing in place. Between the inner periphery of the portion 28 and the axle 16 is shown inserted a packing ring 31 for confining the oil for the bearing.

The spider 27 supports the segmental brake shoes 32 and 33 for cooperation with the opposite braking faces 24 and 25, respectively, of the rotary brake ring 23, and also carries the means for actuating the shoes.

The spider 27 is provided on opposite sides of the axle, see Fig. 1, with radially outward extensions 34 and 35 which are bifurcated at their outer ends as is clearly shown in Fig. 3, the furcations being designated 36 and 37, respectively. Between these radially outward extensions, the spider is provided with an integral cylinder 38 for actuating the shoes.

The shoes 32 and 33 are lined on their working faces with a suitable brake lining, as 39, and on their opposite faces they are provided with three aligned spaced apertured bosses 40, 41, and 42, see Fig. 1, through which they are supported by the bifurcated radially outer arms of the actuating levers 43 and 44. The furcations of the outer arms are designated, see Fig. 1, 45 and 45, and are disposed in the spaces between the bosses 40, 41, and 42 on the adjacent shoe. A hinge pin 45' having a drive fit with the bosses and a loose fit with the lever furcations secures the parts together in operative relation.

The levers 43 and 44 have their intermediate portions pivotally mounted, through pins 46 and 47, on the furcations of the radial extensions 34 and 35 of the spider. The levers have radially inwardly extending arms 48 and 49, respectively, operatively connected to the pistons 50 and 51 of the actuating cylinder 38, through the link struts 52 and 53, respectively.

Suitable flexible dust seals 54 and 55 are provided between the inner ends of the levers and the adjacent ends of the cylinder, and the pistons are also provided with suitable seals as 56 and

57 between them and the cylinder wall. The space between the pistons is connected by a port, as 58, see Fig. 1, to a suitable fluid-pressure line, and another port, as 59, may connect the fluid-pressure line to the other wheel associated with the axle. The top of the cylinder may be provided with a bleeding port closed by a plug 60.

With the arrangement shown and described, the shoes may be made so they are interchangeable, and the same is true of the actuating levers, the pistons and struts, and the seals associated with the cylinder and pistons.

To hold the shoes parallel to each other and spaced a suitable distance apart, when the brakes are not applied, the following means may be employed, one such means being provided at each of the adjacent ends of the shoes. Only one such means need be described, and reference is had to Figs. 1 and 4 in the following description.

Such means may comprise a U-shaped element 61 of channel section embracing the adjacent shoe ends. One arm 62 of the U is rigidly secured as by a bolt 63 to the back of one shoe, as 33, and the other arm 64 is slidably mounted on an elongated bolt 65 secured to the back of the other shoe 32. A spring 66 encircling the bolt 65 and acting at its opposite ends upon the head 67 of the bolt and upon the arm 64 acts yieldingly to force the shoes apart. The distance the shoes are forced apart is determined by an adjustable stop nut 68 on the bolt 65.

It may also be desirable to provide means for holding the shoes spaced equal distances from the opposite sides of the brake ring, when the brakes are not applied. Such means may comprise an arm 69 rigidly bolted, through a bolt 69' (Fig. 1), at one end to the adjacent extension 34 or 35 of the spider 27 and having a bolt 70 pass through its opposite end and being loosely guided in the adjacent arm 64 of the U-shaped member. A spring 71 surrounding the bolt and reacting at its ends on the arm 69 and the adjacent arm 64 of the U-shaped member 61 holds the shoes spaced equal distances from the opposite faces of the brake ring, the distance being controlled by the adjustable nut 72 locked in adjusted position by a lock nut 73.

The operation of the brake mechanism is believed clear from the foregoing detailed description.

While a specific form of the invention has been described in detail, it will be understood that changes and modifications may be made by those skilled in the art without departing from the spirit and scope of the appended claims.

What is claimed is:

1. In a vehicle brake, in combination with a wheel, axle, and axle support, a rotary brake element supported at its radially outer periphery and having spaced radially extending braking faces held in axially fixed position, opposed segmental brake shoes supported in cooperative relation with the respective radial braking faces, and supporting and actuating means for said shoes comprising a radially extending spider secured at its radially inner portion to the axle support, said spider carrying an integral actuating cylinder, said cylinder having opposed pistons operatively connected at the opposite ends of the cylinder to brake levers, said brake levers being mounted on pivot pins carried by fixed supports rigid with the spider, and said brake levers being connected by pivot pins to the respective shoes.

2. In a vehicle brake, in combination, a rotary brake element having spaced annular radially extending braking faces, opposed segmental brake shoes supported in cooperative relation with the respective braking faces, and means associated with the adjacent ends of the shoes for normally yieldingly maintaining them spaced apart a predetermined distance, said means comprising a U-shaped member embracing the adjacent shoe ends and having one arm of the U rigidly secured to one shoe and the other arm yieldingly secured to the other shoe.

3. In a vehicle brake, in combination, a rotary brake element having spaced annular radially extending axially fixed braking faces, opposed segmental brake shoes supported in cooperative relation with the respective braking faces, an axially fixed support for said shoes, means associated with the adjacent ends of the shoes for normally yieldingly maintaining them spaced apart a predetermined distance, and means associated with said first-named means and said support for yieldingly maintaining the shoes spaced substantially equal distances from said braking faces.

4. In a vehicle brake, in combination with a wheel, axle, and axle support, a rotary brake element supported from its radially outer periphery and having spaced annular radially extending braking faces held in axially fixed position, opposed segmental brake shoes supported by brake levers in cooperative relation with the respective radial braking faces, and a support for the shoes and levers comprising a radially extending spider secured at its inner end to the axle support, said spider being provided with pivotal means rigid therewith for mounting the intermediate portions of the brake levers which have their outer ends pivotally secured to the respective shoes, and a cylinder actuator rigidly carried by the spider and having oppositely movable actuating elements disposed between and acting on the inner ends of said levers.

5. In a vehicle brake, in combination, a rotary brake element having spaced annular radially extending braking faces, opposed segmental brake shoes supported in cooperative relation with the respective braking faces, a support for said shoes supporting them intermediate their ends, means associated with the adjacent ends of the shoes for normally yieldingly maintaining them spaced apart a predetermined distance, said means comprising a U-shaped member embracing the adjacent shoe ends and having one arm of the U rigidly secured to one shoe and the other arm yieldingly secured to the other shoe, and means for yieldingly maintaining the shoes spaced substantially equal distances from the braking faces comprising a member rigidly secured to said support and yieldingly secured to said U-shaped member.

CAROLUS L. EKSERGIAN.

References Cited in the file of this patent

UNITED STATES PATENTS

| Number | Name | Date |
|---|---|---|
| 2,084,216 | Poage et al. | June 15, 1937 |
| 2,115,083 | Pierce | Apr. 26, 1938 |
| 2,322,049 | Newell | June 15, 1943 |
| 2,363,453 | Tack | Nov. 21, 1944 |
| 2,424,922 | Sadon | July 29, 1947 |